United States Patent
Kratz

(10) Patent No.: US 11,284,479 B2
(45) Date of Patent: *Mar. 22, 2022

(54) RADIO ACCESS NODES COLOCATED WITH AIR CONDITIONING UNITS

(71) Applicant: Tyler Michael Kratz, Pleasant Valley, IA (US)

(72) Inventor: Tyler Michael Kratz, Pleasant Valley, IA (US)

(*) Notice: Subject to any disclaimer, the term of this patent is extended or adjusted under 35 U.S.C. 154(b) by 450 days.

This patent is subject to a terminal disclaimer.

(21) Appl. No.: 16/031,283

(22) Filed: Jul. 10, 2018

(65) Prior Publication Data

US 2018/0324898 A1 Nov. 8, 2018

Related U.S. Application Data

(62) Division of application No. 14/635,190, filed on Mar. 2, 2015, now Pat. No. 10,080,256.

(Continued)

(51) Int. Cl.
| | |
|---|---|
| *H04W 84/12* | (2009.01) |
| *H04W 88/10* | (2009.01) |
| *F24F 11/30* | (2018.01) |
| *F24F 11/62* | (2018.01) |
| *F24F 1/027* | (2019.01) |
| *F24F 11/58* | (2018.01) |

(52) U.S. Cl.
CPC ............ *H04W 88/10* (2013.01); *F24F 1/027* (2013.01); *F24F 11/30* (2018.01); *F24F 11/62* (2018.01); *F24F 11/58* (2018.01)

(58) Field of Classification Search
CPC ......... H04L 12/66; H04W 88/10; F24F 11/30; F24F 11/62; F24F 1/02; F24F 11/00; F24F 11/58; F24F 1/027; G05D 16/2066; G05D 23/185; G01D 4/004
See application file for complete search history.

(56) References Cited

U.S. PATENT DOCUMENTS

| 5,801,632 A | 9/1998 | Opal |
|---|---|---|
| 7,023,399 B2 | 4/2006 | Zaretsky et al. |

(Continued)

*Primary Examiner* — Hanh N Nguyen
(74) *Attorney, Agent, or Firm* — Knobbe, Martens, Olson & Bear, LLP

(57) ABSTRACT

A wireless communication system includes an electrically powered window mounted air conditioning unit including a power cord attachable to an electrically powered wall outlet. A small cell wireless communication device is attached to or located within the electrically powered window mounted air conditioning unit. The small cell wireless communication device is configured to be powered through the power cord of the electrically powered window mounted air conditioning unit. The small cell wireless communication device includes at least one antenna for receiving and transmitting wireless information. The small cell wireless communication device is configured to communicate with a nearby wireless data communication router, wherein the wireless data communication router is configured to provide backhaul communication capabilities for the small cell wireless communication device. The small cell wireless communication device is configured to provide wireless communication capabilities for mobile wireless communication devices.

7 Claims, 8 Drawing Sheets

Related U.S. Application Data

(60) Provisional application No. 61/947,044, filed on Mar. 3, 2014.

(56) References Cited

U.S. PATENT DOCUMENTS

| | | | |
|---|---|---|---|
| 7,081,830 B2 * | 7/2006 | Shimba | G05B 19/042 340/12.31 |
| 7,933,619 B2 | 4/2011 | Kim | |
| 8,090,477 B1 * | 1/2012 | Steinberg | G05D 23/1923 700/278 |
| 8,351,920 B2 | 1/2013 | Gallagher | |
| 8,813,517 B2 | 8/2014 | Lee | |
| 9,046,285 B2 | 6/2015 | Emam | |
| 10,080,256 B2 * | 9/2018 | Kratz | F24F 11/30 |
| 2009/0280819 A1 | 11/2009 | Brisebois et al. | |
| 2009/0298472 A1 | 12/2009 | Nagano | |
| 2010/0124228 A1 | 5/2010 | Tinnakornsrisuphap et al. | |
| 2010/0153816 A1 | 6/2010 | Li et al. | |
| 2011/0005261 A1 * | 1/2011 | Lee | A61L 9/22 62/331 |
| 2011/0098027 A1 | 4/2011 | Rajasimman et al. | |
| 2012/0169584 A1 | 7/2012 | Hwang | |
| 2012/0179810 A1 | 7/2012 | Contreras et al. | |
| 2014/0159877 A1 | 6/2014 | Huang | |
| 2014/0244001 A1 * | 8/2014 | Glickfield | H04L 67/16 700/33 |

\* cited by examiner

RADIO ACCESS NODES COLOCATED WITH AIR CONDITIONING UNITS

CROSS-REFERENCE TO RELATED APPLICATIONS

This application claims priority to provisional application 61/947,044 filed on Mar. 3, 2014, the entire contents of which are hereby incorporated by reference.

DESCRIPTION

Field of the Invention

The following description relates generally to wireless communications and more specifically to optimizing capacity of a wireless network by deploying small cell radios and the placement of these radios in, on or around window air conditioning units.

Background of the Invention

Constant growth in data consumption by smartphones, tablets and other mobile devices requires that wireless network operators increase network capacity. There are various methods of increasing capacity: introduction of more spectrum, increasing the information rate by improving the efficiency of the physical layer protocol/channel access protocol and cell splitting. In the history of wireless communications, the greatest gain in wireless network capacity results from cell splitting.

Cell splitting, otherwise known as frequency reuse, is the practice of lowering the power and coverage area of each radio. By making the 'cell smaller' the total capacity of the network increases. Traditionally, cell splitting meant the introduction of more 'macro cells', large base stations that operate on high power limits in a network. Presently network operators are deploying 'small cells', radios whose sole purpose is to add network capacity and cover a limited area. In the next few years it is forecasted that millions of small cells will be required to be deployed in order to adequately cover the amount of worldwide mobile data consumed. Projected by 2020, '5G' standards will require many remote nodes closer to the end user.

'Small cell' is a term for a radio whose goal is to increases network capacity, transmits low power signal and has a small coverage radius. Some different names of small cells include: femtocell, nanocell, micro, picocell, pCell, and metrocell. While 'small cell' generally denotes a radio operating on licensed spectrum, WiFi and LTE-U/LAA are also high capacity, low power, small coverage area technologies operating on unlicensed spectrum. Small cell may also refer to multiple, closely located cells whereby interference is promoted (such as in a 'DIDO' system). There are three main requirements necessary to deploy a small cell into a wireless network: attachment, power and backhaul. Carriers are having a difficult time obtaining all three requirements and deploying in a timely and cost effective manner.

There are currently over 35 million window air conditioning units in the United Stated and hundreds of millions worldwide. The placement of window air conditioning units is optimal for small cells as: they are at various heights, the external planes frequently face streets or pedestrian areas and the location of air conditioning units is highly correlated with the density of people/mobile subscribers in an urban area. Window air conditioning units are in optimal locations to both receive and transmit wireless data from inside or outside the dwelling unit, and to or from above and/or ground level. Implementing small cell radio and antenna(e) into window air conditioner units can address the three fundamental deployment requirements for smalls cells: attachment, power and backhaul.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with locating small cells collocated in, on or around window mounted air conditioning ("AC") units in order to facilitate greater network capacity. In one embodiment, the radio may be a removable 'cartridge' that may be added, removed or swapped on or inside the AC unit. The AC unit collocated with the small cell (together the "AC/SC") receives backhaul from a variety of possible sources and then transmits a signal either inside or outside the residence to either a mobile or fixed device which may include another AC/SC. The small cell radio may be passively or actively protected against the vibrations when the AC unit is operating in order to prevent resonance or destructive interference. Similar to small cells not located inside an AC unit, the AC/SC may operate on one or multiple frequency bands, with one or more radios. The six planes of an AC/SC allow the integration of advanced antenna technologies such as: multiple input multiple output (MIMO), planar, beamforming and array antenna or any combination of the technologies. Utilizing the multiple planes and extensive surface area, an AC/SC may receive and transmit on one plane or part thereof while receiving on another, in multiple bands if desirable. Concurrent operation in multiple frequency bands may be used by multiple network operators or for carrier aggregation by a single network operator.

According to an example, an AC/SC may be powered either exclusively by hardline power where the AC unit is normally connected in the dwelling unit or supplemented by a solar panel affixed to the AC/SC unit. The AC/SC receives backhaul data from a source inside or around where the AC/SC is located and transmitting a RF signal to a fixed or mobile device outside the dwelling unit. The backhaul inside the dwelling may include hardwire broadband or wireless, including but not limited to, WiFi or WiGig from the dwelling or neighboring unit. Similarly, broadband providers such as MSOs or FTTH providers may assign a SSID, other designated channel or address on their set top boxes to provide backhaul to an AC/SC unit. In the aforementioned embodiments, the person or entity facilitating the backhaul to the AC/SC may receive remuneration for the data provided.

In another example, an AC/SC receives backhaul from an external RF signal such as line-of-site backhaul or non-line-of-site backhaul such as cellular data (ie: EVDO, HSPA, WiMAX, LTE, LTE-A). The AC/SC transmits the backhauled data either inside the dwelling unit by hardwire or wirelessly. In an additional embodiment, AC/SC transmits the external RF backhauled data to an outside mobile or fixed device including an AC/SC. In an embodiment, when a suitable density of AC/SC units exists, the AC/SC units participate in a wireless mesh network. In this embodiment, at least one AC/SC will require backhaul external to the AC/SC system then this AC/SC will then wirelessly backhaul to other AC/SC units in a common industry practice of mesh technology.

All embodiments the AC/SC may incorporate the ability to self-organize the network furthering the planning, configuration, management, optimization and healing of the wireless whether composed solely of AC/SDs or where AC/SDs are incorporated into a larger network. In one embodiment, the AC/SC may or may not transmit signal, but is used as sensor of RF further enabling planning, configuration, management, optimization and healing of various networks.

In all embodiments a GPS unit may be located in the AC/SC. The GPS unit in the AC/SC can communicate the location at any given time of the AC/SC so long as the unit can: synch with GPS; has power; and some level of connectivity. Additionally, the unit may store GPS coordinates from time to time when there is no external data connectivity and these coordinates may be transmitted at a later time. A fisheye camera may be included in the unit for monitoring or so that by itself or in conjunction with GPS data, the position of the AC/SC can be determined with real time specificity allowing for intelligent network design and electromagnetic radiation management can occur. Positional information from GPS and/or camera images may assist in radio frequency planning/deployment and self-organizing networks (SON)

In another aspect, information from the AC/SC such as location (GPS coordinates) and RF levels of multiple frequency bands detected in the proximity will be provided to an aggregation point which may be accessed through central system. The owners of the AC/SC or network operators may use this information for network planning/configuration in their independent networks or adjust use of each AC/SC in real time given the supply and demand of capacity and coverage on their network. This information further enables the AC/SC to simultaneously transmit on multiple frequencies, on multiple networks operated by multiple operators. An additional embodiment includes a hierarchical system to sell transmission access to carriers on each AC/SC in real time. The system can conduct a real time auction for access to not only the AC/SC but also each plane or subset of the antennae on the AC/SC.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings illustrate the invention. In such drawings.

DETAILED DESCRIPTION OF THE PREFERRED EMBODIMENTS

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, small cells may be collocated in, on or around window mounted air conditioning ("AC") units in order to facilitate greater network capacity. The AC unit collocated with the small cell (together the "AC/SC") receives backhaul from a variety of possible sources and then transmits a signal either inside or outside the residence to either a mobile or fixed device which may include another AC/SC. Similar to small cells not located inside an AC unit, the AC/SC may operate on one or multiple frequency bands, with one or more radios. The six planes of an AC/SC allow the integration of advanced antenna technologies such as: multiple input multiple output (MIMO), planar, beamforming and array antenna or any combination of the technologies. Utilizing the multiple planes and extensive surface area, an AC/SC may receive and transmit on one plane or part thereof while receiving on another or in multiple bands if desirable.

Figure 1:
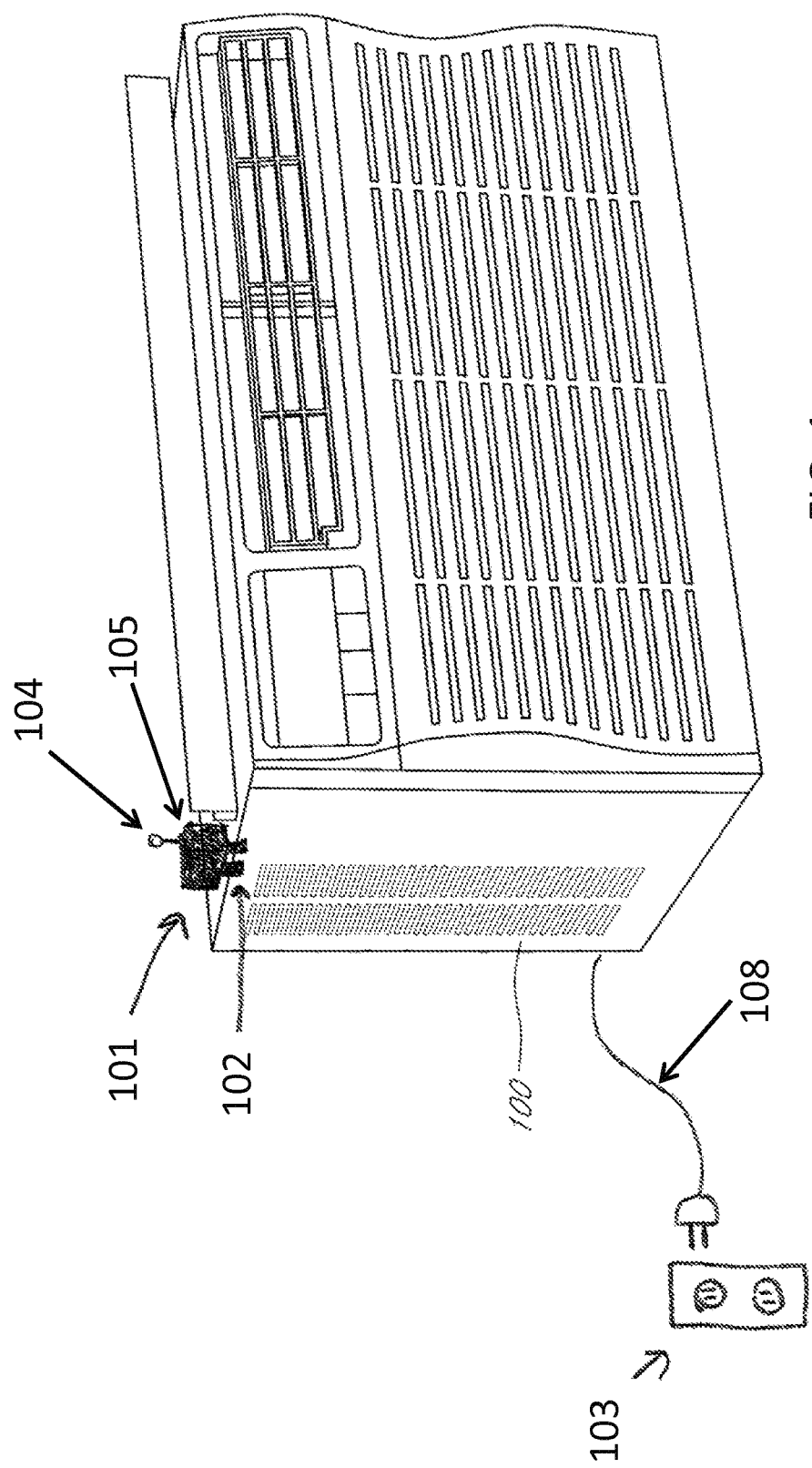
FIG. 1 illustrates a standard air condition unit with a small cell affixed to the exterior of the air condition unit housing.

Referring to FIG. 1, illustrated is a window AC unit 100 with a small cell radio 101 affixed to the top edge of the unit. The small cell radio may be located anywhere on the AC unit 100. Additionally, the small cell radio 101 may be removable, docking at a power attachment socket 102. The power attachment socket 102 is connected inside the AC unit 100 and ultimately draws power from a standard wall socket 103. The external small cell radio 101 may have integrated antenna 104 or may also attach at antenna input socket 105 that connects antenna 104 on the AC unit. The small cell radio 101 may also be located near but not on the AC unit 100 such as on a wall for better propagation but may connect by cord 108 to the power attachment at the input socket 102. The power attachment socket 102 or other structure can integrate a vibration management system, which can actively or passively protect the small cell radio 101 against vibrations when the AC unit 100 is operating in order to prevent resonance or destructive interference. For example, a passive vibration management system can include mounting the small cell radio 101 through vibration damping washers or standoffs that reduce or eliminate external vibrations. Such vibration damping washers or standoffs can be made from rubber or synthetic materials such as Sorbothane™.

Figure 2:
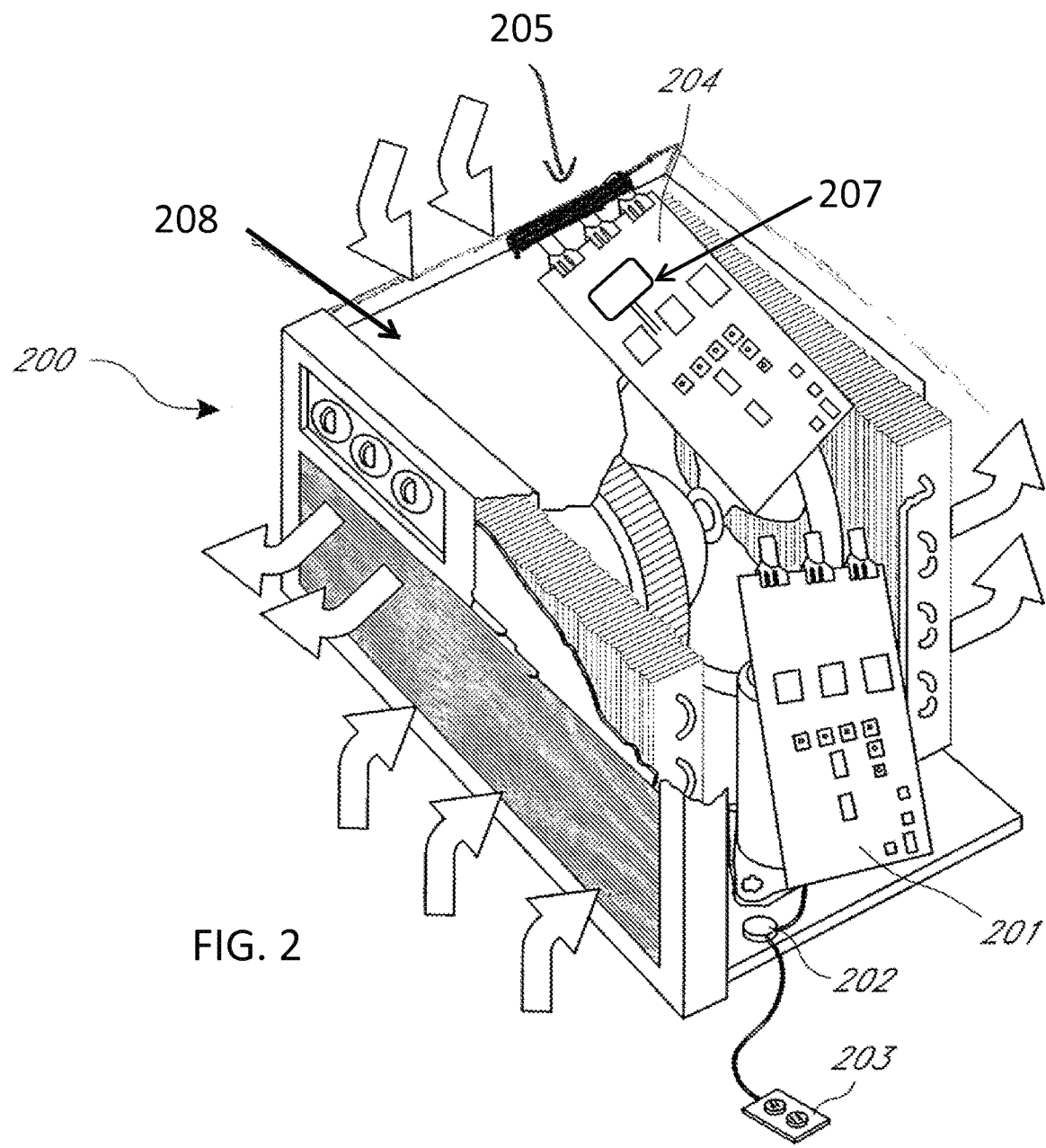
FIG. 2 illustrates a standard air condition unit with a small cell radio located inside the air conditioner unit housing and a small cell in a removable cartridge.

Referring to FIG. 2, illustrated is a window AC unit 200 with a small cell radio 201 located inside the AC unit 200. The small cell radio 201 is connected to a power source 202 inside the AC/SC 200 that is powered by the AC unit 200 and ultimately draws power from a standard socket 203. Alternatively, a small cell radio 201 can be in the form of a removable cartridge 204 which can dock with a receiving port 205 that supplies power and connection to antenna 207. The small cell radio cartridge 204 may be accessible on the exterior of the AC unit 200 or behind the exterior shielding 208 of the AC unit 200 for security. The removable cartridge allows for the upgrade, removal or addition of a small cell radio without disrupting the operation of the AC unit or the cost in replacing the entire AC/SC. This embodiment can also incorporate a vibration management system, which can actively or passively protect the small cell radio 201 against vibrations when the AC unit 200 is operating in order to prevent resonance or destructive interference.

Figure 3:
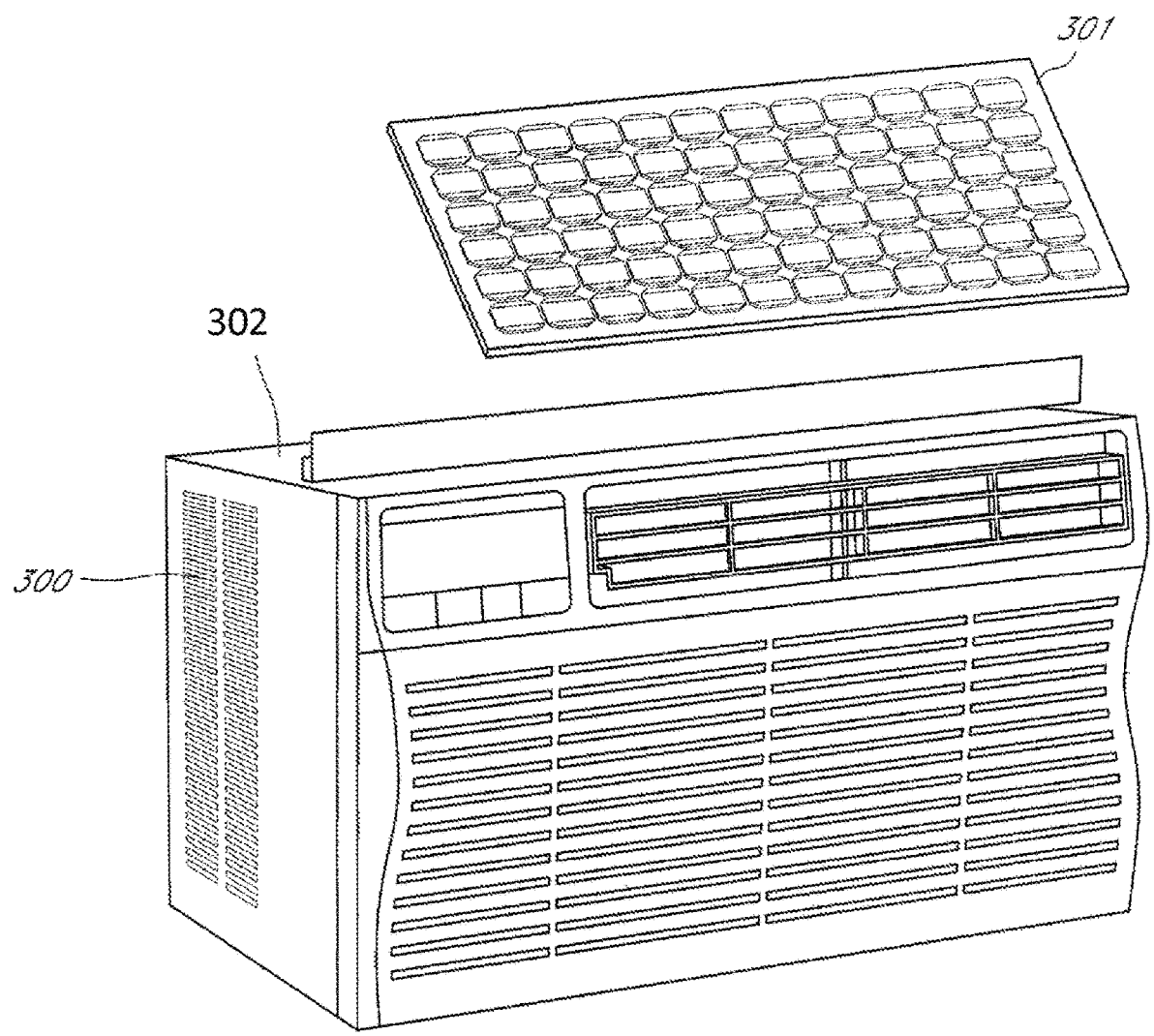
FIG. 3 illustrates the multiple planes of an AC/SC unit and that each plane may act as an antenna operating on a different frequency than the other planes.

Referring to FIG. 3, illustrated is an AC/SC 300 with a photovoltaic solar panel 301 affixed to the top plane 302. The solar panel 301 may be affixed to any plane. The AC/SC maintains a direct power connection with the wall socket, but additional energy may be gleaned from the solar panel 301. The amount of power generated by the solar panel 301 will mitigate, offset or surpass the amount of power consumed by the small cell radio. The small cell radio shares any source of power that the AC unit operates on thereby eliminating the need to find an additional power source for the radio.

Figure 4:
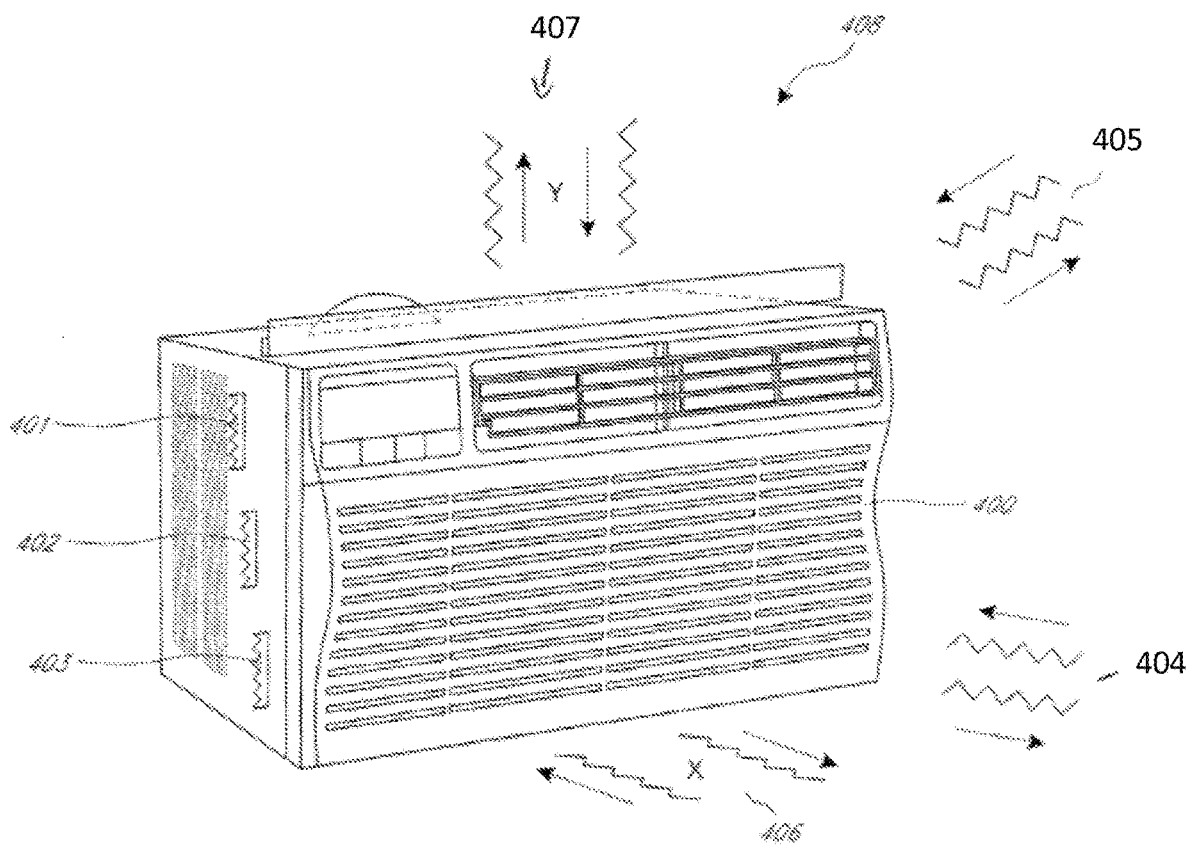
FIG. 4 illustrates an AC/SC unit backhauled by various sources and transmitting to various areas.

Referring to FIG. 4, illustrated is a window AC unit 400 and the multiple planes acting as antennae. Each plane may be comprised of a single frequency antenna 401, house multiple specific frequency antennae 402, or contain an antenna array 403. Each plane may be transmitting and/or receiving on the same frequency 404 or different planes may transmit and or receive on different frequencies 405, concurrently if elected. Concurrent operation in multiple frequencies may be utilized by multiple network operators or for carrier aggregation by a single network operator. The AC/SC can transmit and receive on frequencies, modulations and standardized technologies that include but are not limited; to 600 MHz, 700 MHz, 800 MHz, 900 MHz, 1800 MHz, AWS, 2.3 GHz, 2.4 GHz, 2.5-2.7 GHz, 3.5 GHz, 5 GHz, 60 GHz, 70-80 GH, millimeter wave bands or any other frequencies designated for wireless communication, CDMA, GSM, LTE, LTE-A, LTE-U/LAA, Bluetooth, Bluetooth Low Energy, WiFi, Near Field Communications WiGig or any other communication protocols as would be understood by a person of skill in the art by the present disclosure. In one example, the bottom plane 406 uses MIMO technology to transmit and receive data on frequency X while the top plane 407 used planar antenna technology to transmit and receive on frequency Y. Any combination of the aforementioned may be utilized. Additionally, one or more planes such as the back plane may be used as an RF or other sensor used to determine EMR, determine spectral demand/use and RF planning any of which may be done looking at reports of historical data or in real time and transferred by the AC/SC over an internet connection.

Figure 5:
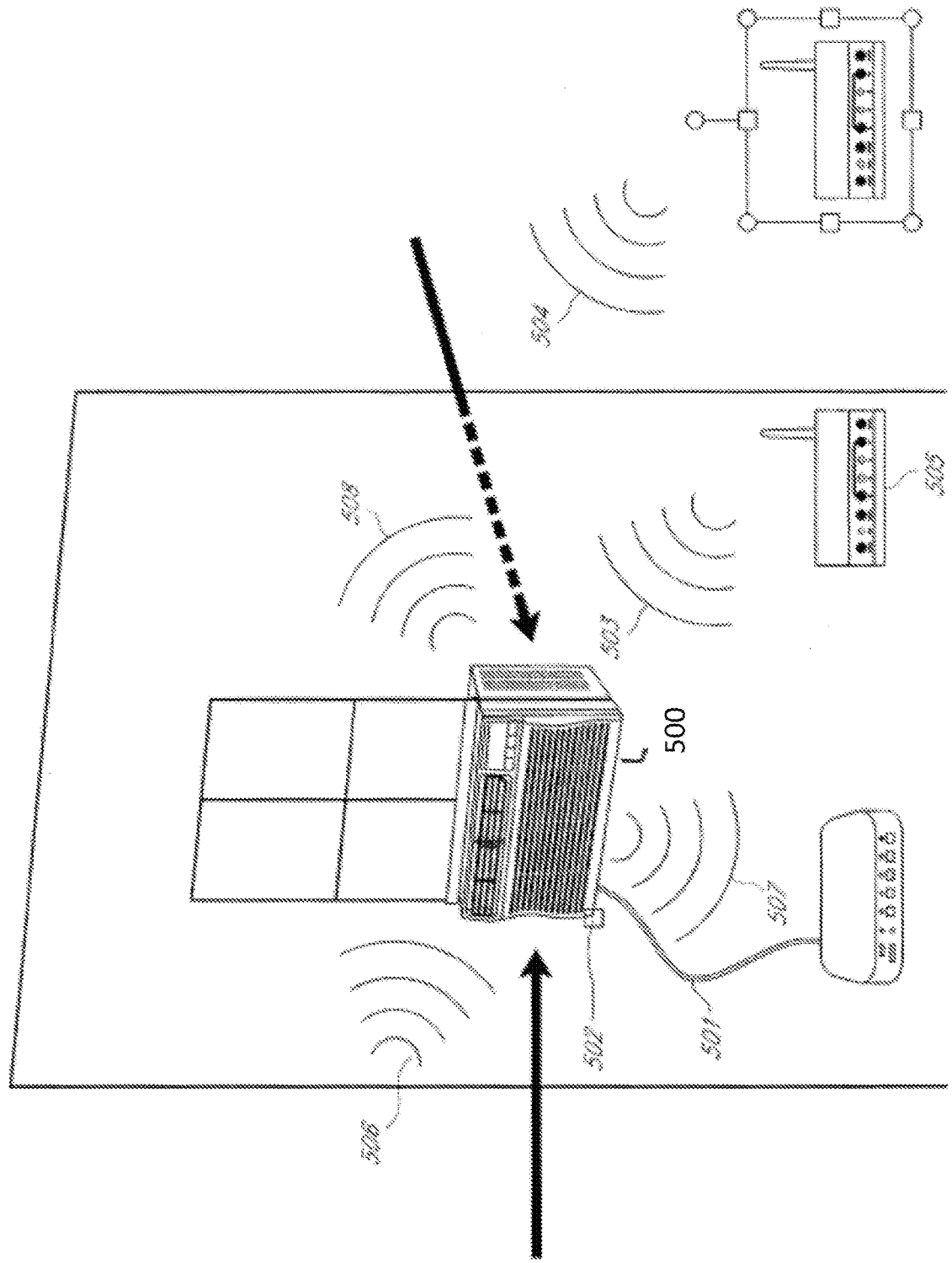
FIG. 5 illustrates a group of AC/SC units where one unit is backhauled independently and then meshes with other AC/SC units.

Referring to FIG. 5, illustrated is an AC/SC 500 backhauled by a hardwire broadband connection 501 from inside the residence where the AC/SC 500 is located. The broadband connection may be an Ethernet cable connected to a device including but not limited to: a DSL or DOCSIS modem or media converter. An additional embodiment would integrate the DSL/DOCSIS modem, media converter or broadband over power line modem 502 into the AC/SC 500. The integrated DSL/DOCSIS modem, media converter or broadband over power line modem may be contained in a removable cartridge for efficient upgrades. In another embodiment, the AC/SC unit 500 is backhauled by WiFi, WiGig, LTE-U/LAA or other local wireless network 503 from a near location 505 or a location remote 504 to where the AC/SC is located. Similarly, broadband providers such as FTTH or MSOs, are able to assign a specific SSID, channel or other address on their set top boxes 505 to provide backhaul to an AC/SC unit. In still another embodiment; the AC/SC 500 unit is backhauled 506 by independent, external RF signal such as line-of-site backhaul or non-line-of-site backhaul such as cellular data (ie: EVDO, HSPA, WiMAX, LTE, LTE-A). In all of the aforementioned embodiments describing backhaul, the AC/SC 500 may be configured to transmit 507 into the location where the AC/SC 500 is located or transmit to the area(s) 508 to the outside portion of the AC/SC 500 faces. In all of aforementioned local wireless network embodiments, the person or entity facilitating the backhaul to the AC/SC 500 could receive remuneration for the bandwidth provided by the backhaul.

Figure 6:
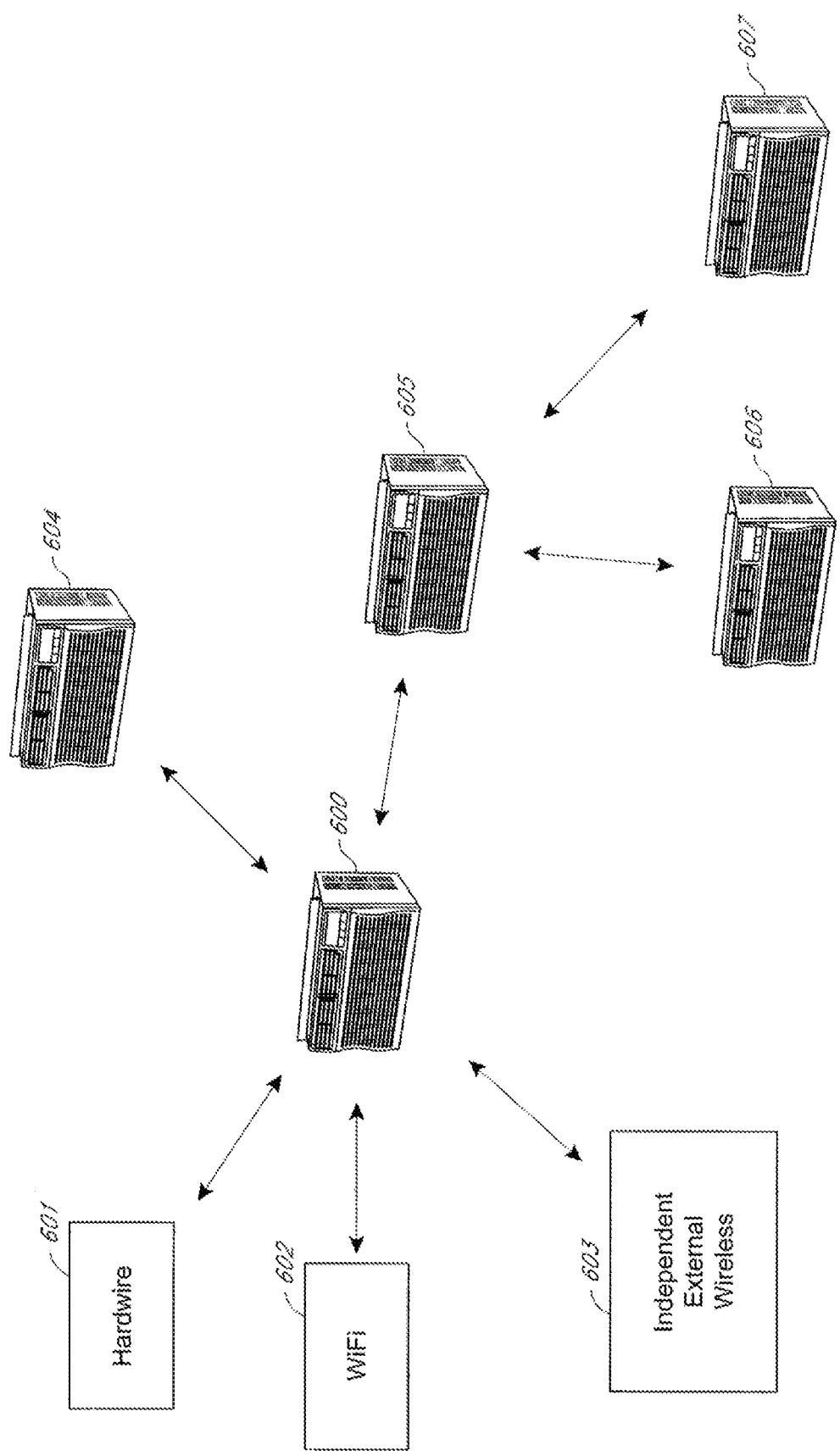
FIG. 6 illustrates the use of GPS and a camera attached to the AC/SC for RF planning, EMR planning or as a video feed.

Referring to FIG. 6, illustrated is an AC/SC 600 is independently backhauled by a source, which may include any of those discussed previously or illustrated in FIG. 5 such as hardwire 601, WiFi 602, or independent external wireless 603. Once AC/SC 600 is backhauled, it then meshes to AC/SC 604 and AC/SC 605. Once meshed AC/SC 605 is backhauled from AC/SC 600, the meshed AC/SC 605 may then backhaul additional AC/SCs 606 and 607.

Figure 7:
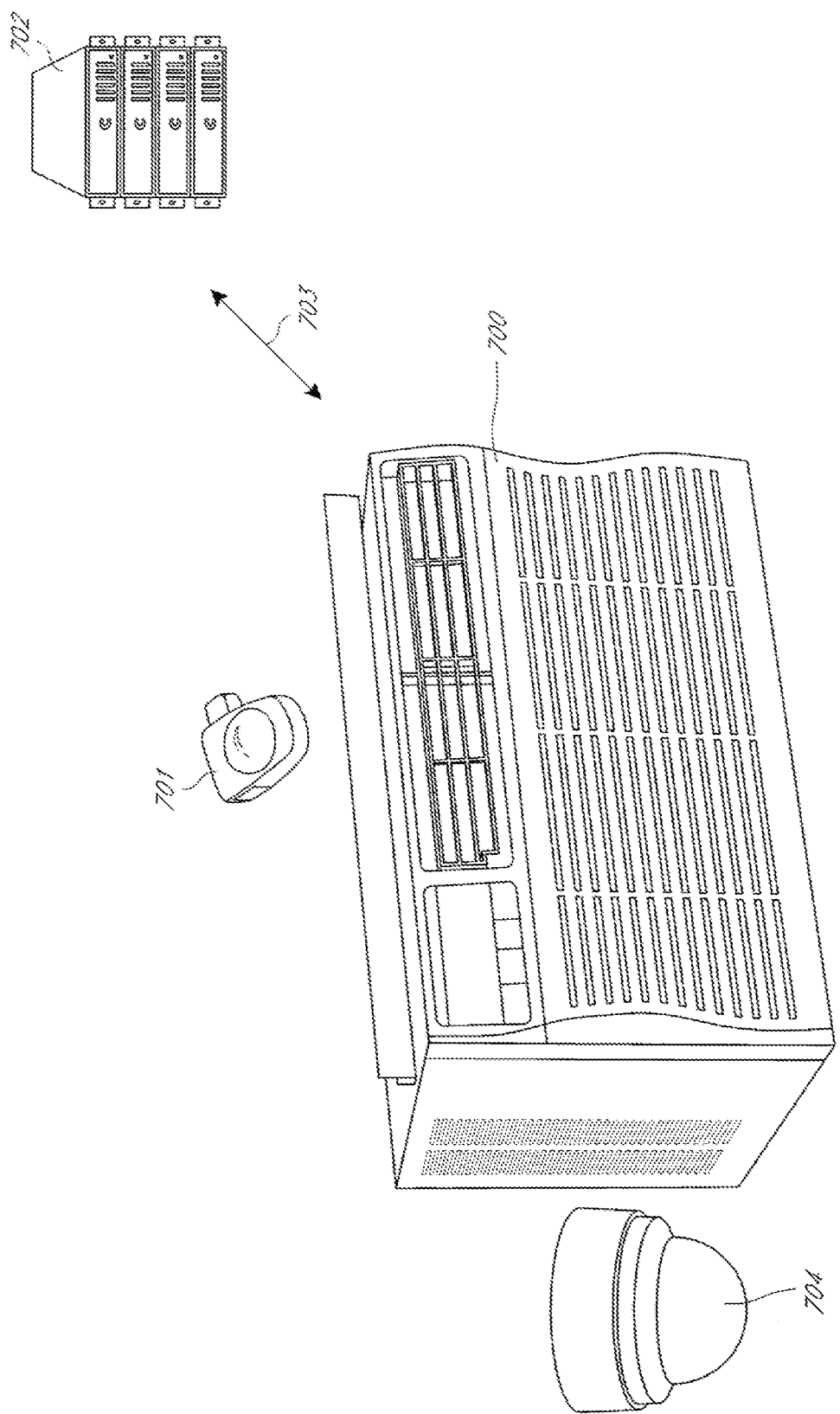
FIG. 7 illustrates a AC/SC with a solar panel affixed.

Referring to FIG. 7, illustrated is an AC/SC 700 with a GPS unit 701 affixed. The GPS unit 701 can update the position of the AC/SC to a central database 702 when a connection to the internet 703 is established. Additionally, the AC/SC may store GPS coordinates whenever the AC/SC has a power source, including hardline or solar, and then upload time specific positional information when an internet connection is established. This information assists the AC/SC operator/controller in analyzing RF demand/planning, propagation and EMR concern.

A fisheye camera 704 (video or picture) may be added to the AC/SC unit 700. The fisheye camera 704 may include stabilization technology or mounted on a stabilizing buffer in order to prevent vibrating images during the operation of the AC/SC unit 700. The visual information gleaned from the camera allows the operator/controller of the AC/SC determine the height of the AC/SC, whether obstructions exist, general topology and the number of persons the AC/SC may transmit. This information assists the AC/SC operator/controller in analyzing RF demand/planning, propagation and EMR concern. The camera may additionally be used as a video stream for uses such as security video. All embodiments of the AC/SC may incorporate the ability to self-organize the network furthering the planning, configuration, management, optimization and healing of the wireless whether composed solely of AC/SDs or a network where AC/SDs are incorporated into a larger network.

Figure 8:
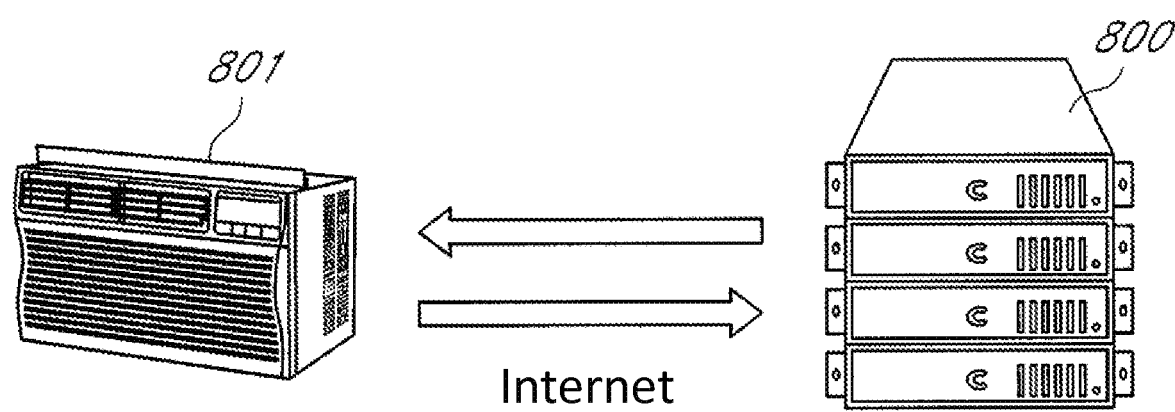
FIG. 8 illustrates information from the AC/SC collected and updated into a central database AC/SCs for conducting an auction for the use of the AC/SC.

Referring to FIG. 8, illustrated is a system whereby information is collected on a central server 800 including but not limited to; lat/long coordinates of the AC/SC 801(s), height of the AC/SC, propagation characteristics of the AC/SC, installed radio bands/antennae, current demand use of the radio bands/antennae(s), the historical demand at the location for a given time/day, real time demand for spectral capacity, and current cost of broadband at different levels of service levels. The central server makes this information available on an interface on a real time basis so network operators may choose to 'rent' radio/antennae capacity on the AC/SC. The network operator may manually, or by automation, secure transmission operations specific amount of time or bandwidth on the radio and antennae through interfacing with the central server 800. Additionally, the central server may keep a compilation of real time prices of bandwidth at different service levels and make this information available and/or to be included in the prices of AC/SC transmission rent. This information may come in real time as broadcast in the actual RF or may be negotiated in wholesale agreements by the operator of the AC/SC. Alternatively, network operators may wish to use rented operational time on AC/SCs as a primary network, switching from an owned network model to a solely or wholly leased one.

Different operators may choose to operate the AC/SC at different times. For instance, a network operator may wish to use their network primarily, but rent access on an AC/SC during peak times of the day or during an anomalous gathering of people such as a street fair. Because the AC/SC is capable of operating in multiple bands simultaneously, multiple network operators may rent space on the AC/SC at the same time.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A wireless communication system configured to increase network capacity of a communications network, comprising:
   a window mounted air condition unit; and
   a small cell wireless communication device affixed to said window mounted air conditioning unit, the small cell wireless communication device configured to increase network capacity of a communications network in order to allow communications with multiple other devices and to receive power through the window mounted air conditioning unit.

2. The wireless communication system of claim 1, wherein the small cell wireless communication device is configured to communicate with a nearby wireless data communication router, wherein the wireless data communication router is configured to provide backhaul communication capabilities for the small cell wireless communication device.

3. The wireless communication system of claim 1, wherein the small cell wireless communication device is configured to provide cellular communication for mobile cellular communication devices.

4. The system of claim 1, wherein the small cell wireless communication device is configured to join a mesh network of a plurality of small cell wireless communication devices.

5. The wireless communication system of claim 1, wherein the small cell wireless communication device is configured to be installed within the air conditioning unit.

6. The wireless communication system of claim 1, wherein the small cell wireless communication device includes a global positioning system.

7. The wireless communication system of claim 1, wherein the small cell wireless communication device includes a camera.

* * * * *